Dec. 24, 1940.  S. E. EPPERSON  2,226,425
SPEED REGULATING DEVICE
Filed May 26, 1938  2 Sheets-Sheet 1
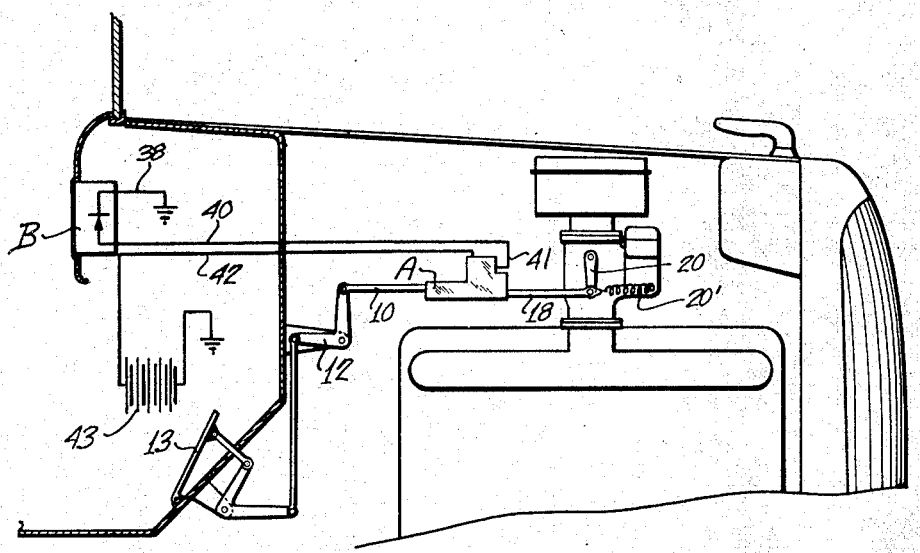
FIG. 1.
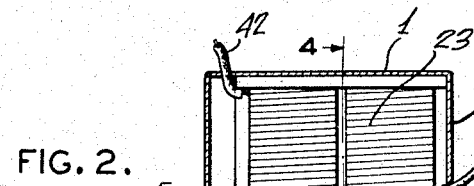
FIG. 2.
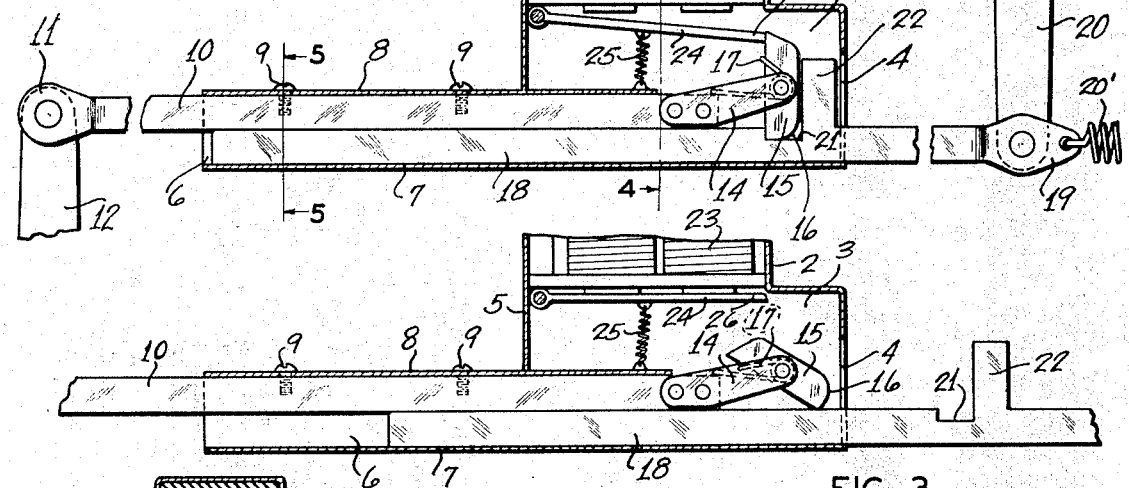
FIG. 3.
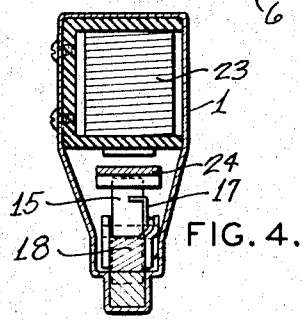
FIG. 4.
FIG. 5.
INVENTOR
SIDNEY E. EPPERSON
BY
ATTORNEY Dec. 24, 1940.  S. E. EPPERSON  2,226,425
SPEED REGULATING DEVICE
Filed May 26, 1938   2 Sheets-Sheet 2

INVENTOR
SIDNEY E. EPPERSON
BY
ATTORNEY

Patented Dec. 24, 1940

2,226,425

UNITED STATES PATENT OFFICE 2,226,425

SPEED REGULATING DEVICE

Sidney E. Epperson, Webster Groves, Mo.

Application May 26, 1938, Serial No. 210,151

5 Claims. (Cl. 180—82.1)

This invention relates to a certain new and useful improvement in speed regulating devices for use in connection with automobiles and other vehicles.

My invention has for its primary objects the provision of a speed regulating device which is simple and economical in construction, which may be conveniently installed on present types of automotive vehicles, which operates quickly and positively, which may be readily varied so as to limit the vehicular speed at any desired maximum, which may be locked in any desired position in a tamper-proof manner, and which is highly efficient in the performance of its intended functions.

And with the above and other objects in view, my invention resides in the novel features of form, construction, arrangement, and combination of parts presently described and pointed out in the claims.

In the accompanying drawings (2 sheets)—

Figure 1 is a fragmentary diagrammatic view of an automotive vehicle and its engine equipped with a speed control device of my present invention;

Figures 2 and 3 are enlarged elevational views, partly broken away and in section, showing the throttle actuator of the device in engaged and disengaged positions, respectively;

Figure 4 is a transverse sectional view of the throttle actuator, taken approximately along the line 4—4, Figure 2;

Figure 5 is a transverse sectional view of the throttle actuator, taken approximately along the line 5—5, Figure 2;

Figure 9:
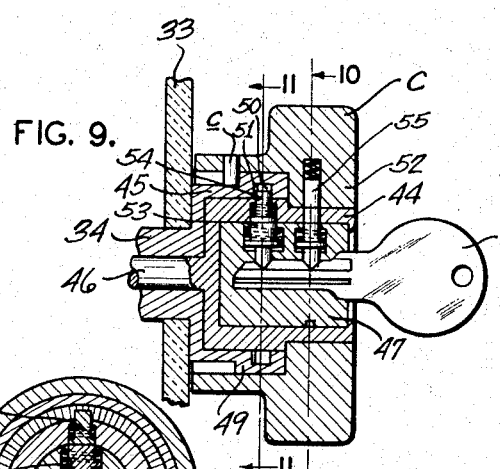
Figure 11:
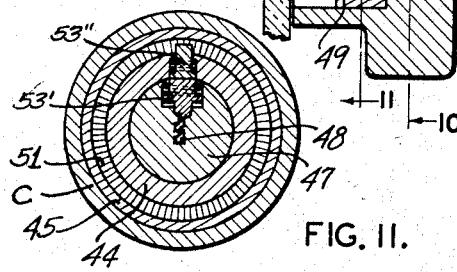
Figure 10:
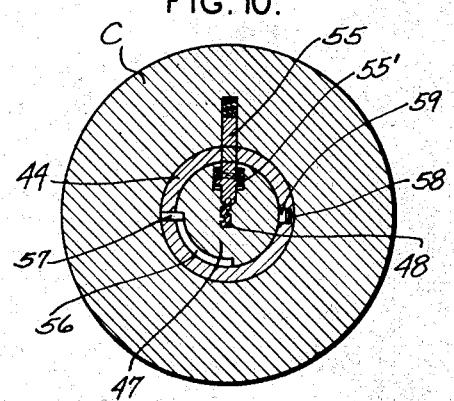

Figure 9 is an enlarged vertical sectional view of the lock forming a part of my present invention; and Figures 10 and 11 are transverse sectional views of the lock, taken approximately along the lines 10—10 and 11—11, respectively, Figure 9.

Referring now in more detail and by reference characters to the drawings, which illustrate a preferred embodiment of my present invention, the device includes a throttle actuator A and a speed responsive mechanism B, the latter serving as a primary control for the actuation of the throttle actuator A, which is secondary in operation.

The throttle actuator or secondary speed-control means A comprises a rectilinear housing 1 constructed preferably of suitable sheet metal and having a vertical front wall 2 bent forwardly and downwardly at its lower extremity in the provision of an enlarged compartment 3 having a forwardly opening aperture 4, as best seen in Figure 2 and for purposes presently more fully appearing.

The housing 1 is also provided with a vertical rear wall 5, which, at its lower extremity, is, in turn, provided with a rearwardly extending tubular member 6 preferably of rectangular cross-section, the bottom wall 7 of which extends beneath and forms a part of the bottom wall of the housing 1. The top wall 8 of the tubular member 6 is parallel to the bottom wall 7 and extends beneath the lower margin of the housing rear wall 5, terminating interiorly of the housing 1, as best seen in Figures 2 and 3 and for purposes presently more fully appearing.

Rigidly mounted, as by means of the screws 9, or other suitable attaching means, upon the under face of the upper wall 8 of the tubular member 6, is a fixed rod 10 extending at its one end rearwardly from the housing 1 and terminating in a bifurcated portion 11 for attachment to the upper end of one leg of a bell crank 12, in turn, connected through suitable linkage to the vehicle accelerator pedal 13, as best seen in Figure 1.

At its other end, the rod 10 extends forwardly into the housing 1 and is rigidly provided with an angularly upwardly extending bearing plate 14. Swingably mounted in the forward end of the bearing plate 14, is a latch member 15 provided at its lower extremity with a cam surface 16 and normally urged yieldingly into upright position by means of a hair-spring 17, as best seen in Figure 2 and for purposes presently more fully appearing.

Slidably disposed in the tubular member 6 preferably beneath the rod 10, is a second rod 18 extending forwardly through the housing 1 and through the aperture 4, the rod 18 being provided at its forwardly extended end with a bifurcated member 19 for attachment to the carbureter-valve lever 20. Intermediate its ends, the rod 18 is formed with a detent including a downwardly extending notch 21, the forward wall of which extends into and merges with the rearward wall of an upwardly extending abutment arm 22 of sufficient height to pass freely through the aperture 4 and for abuttingly engaging the forwardly presented end face of the latch member 15.

The detent forming notch 21 and abutment arm 22 are so positioned along the rod 18 as to be normally disposed in the compartment 3 of the housing 1 when the throttle actuator A is in operatively latched or locked position, as best seen in Figure 2.

Rigidly mounted in the upper portion of the housing 1, is an electro-magnet 23 having downwardly presented pole pieces and being provided at its lower end with a vertically swingable traction bar 24 operatively attached intermediate its ends to one end of tension spring 25, which, in turn, at its other end is attached to the upper face of the inwardly extending extremity of the tubular top wall 8 for resiliently swinging the traction bar 24 downwardly for engagement at its forward end 26 with the upper extremity of the latch member 15, all as best seen in Figure 2 and for purposes presently more fully appearing.

Mounted preferably on the instrument or other accessible place in the vehicle, is the speed responsive mechanism or primary control B, which is constructed substantially in the manner of a conventional speedometer having an outer cylindrical housing 27, a dial 28, and an indicator hand 29 adapted for swingable movement in front of the dial 28 responsive to the speed of the vehicle, as will be well understood by those familiar with the art.

Rigidly mounted on the housing 27 in front of the dial 28, is a base block 30 preferably formed of a suitable dielectric material and provided with a pair of upwardly extending curved arms 31, which are, in turn, at their upper extremities rigidly provided with a circular bearing plate 32.

Rigidly mounted in the bearing plate 32 and extending forwardly through a suitable registering aperture in the glass or other transparent face plate 33 of the control mechanism B, is a sleeve 34 rotatively provided with a shaft 35 having at its inner end a radially extending setting hand 36. At its outer end, the shaft 35 may be connected with a diametrally enlarged turning knob C, either directly or through a locking mechanism, as will presently be more fully described.

The indicator hand 29 is provided intermediate its ends with a contact button 37 connected by a suitable flexible conductor 38 to any available metallic frame portion of the vehicle as a ground. The set hand 36 is similarly provided with a contact-button 39 positioned for contactive engagement with the contact-button 37 of the indicator-hand 29 when the latter swings around into registration with the set hand 36 during operative movement of the vehicle, the contact button 39 being electrically connected through the body of the set hand 36, the bearing ring 32, and one of the supporting arms 31 to a suitable electrical conductor 40, which is, in turn, connected to one of the terminals 41 of the electromagnet 23 of the throttle actuator A, the other terminal of the electro-magnet 23 being, in turn, connected through the flexible conductor 42 to the vehicle storage battery 43 or other source of electrical current, as best seen in Figure 1.

Figure 6:
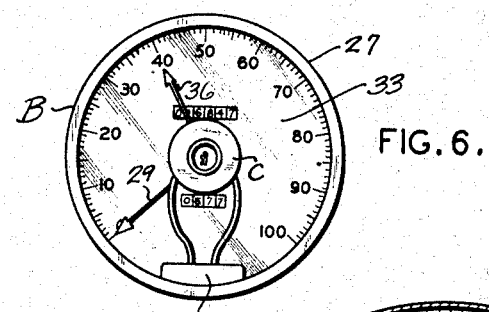
Figure 6 is a front elevational view of the speed responsive control mechanism of the device.
Figure 7:
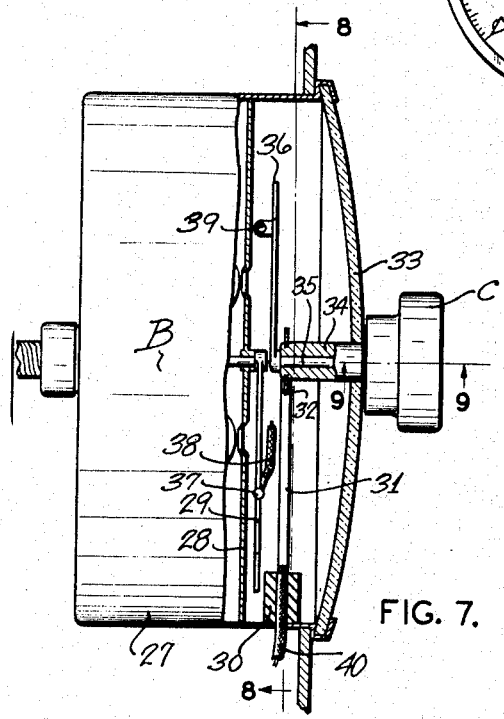
Figure 7 is a side elevational view, partly broken away and in section, of the speed responsive control mechanism.
Figure 8:
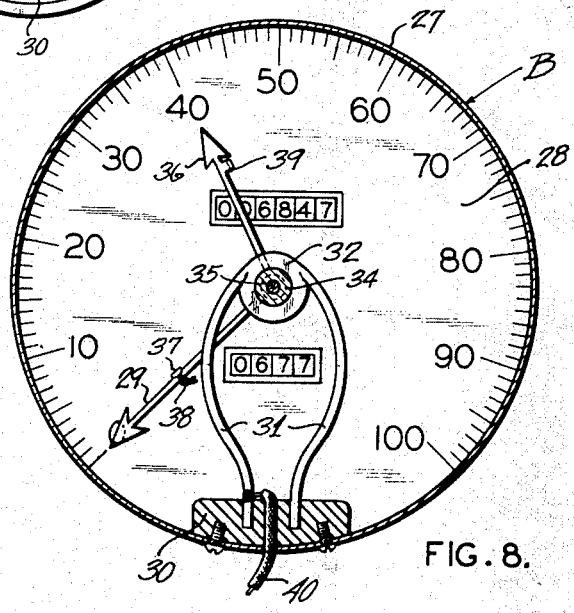
Figure 8 is a vertical sectional view of the speed responsive control mechanism, taken approximately along the line 8—8, Figure 7.

In use and operation, the knob C is turned and the set hand 36 swung into incidence with any particular figure on the speedometer dial 28 corresponding to the particular maximum speed limit desired for the vehicle, such as, for instance, forty M. P. H., as seen in Figure 8. As the motor is started and the vehicle takes up forward motion, the operator may increase the speed thereof in the normal manner by depressing the foot accelerator pedal 13. This depression of the pedal 13 will be transmitted through suitable linkage to the bell crank 12 and move the rod 10 rearwardly. Since the rod 10 is rigidly connected to the housing 1 and is furthermore latched to the rod 18 through the latch member 15, as shown in Figure 2, the entire housing and the rod 18 will also move rearwardly with the rod 10 responsive to movement of the accelerator pedal 13, thereby actuating the carbureter control lever 20 and accordingly increasing the vehicle speed as may be desired by the operator.

When, however, the vehicle speed reaches the desired maximum, that is to say, in the present instance, forty m. p. h., the indicator hand 29 will swing into registration with the set hand 36, bringing the contact buttons 37, 39, into circuit completing engagement and consequently energizing the electro-magnet 23, which thereupon swings the traction bar 24 upwardly against the action of the spring 25, withdrawing the forward end 26 thereof from retentive engagement with the upper end of the latch member 15. Since the rod 10 and the associated housing 1 is held in rearwardly disposed position by the action of the foot accelerator pedal 13, and furthermore since the rod 18 and the carbureter control lever 20 are normally urged forwardly by action of the carbureter spring 20', which is considerably stronger than the hair-spring 17, the rod 18 will be pulled forwardly as soon as the latch 15 is released, swinging the latch rearwardly out of the notch 21, thereby disconnecting the rod 18 from the rod 10 and the associated foot accelerator pedal 13, as best seen in Figure 3. When thus disconnected, the rod 18 and the associated carbureter control lever 20 will be pulled forwardly to initial closed position under impulse of the carbureter spring 20', thereby shutting off the supply of fuel to the engine and limiting the speed of the vehicle.

As soon as the vehicle speed drops below the maximum, the indicator hand 29 will swing away from the set hand 36, disconnecting the contact points 37, 39, and breaking the circuit to the electro-magnet 23, which will, in turn, become de-energized and release the traction bar 24. Thereupon, the operator, by releasing pressure on the foot pedal 13, may permit the rod 10 and the housing 1 to move forwardly to initial position, whereupon the lower margin of the latch member 15 will slide over the upper face of the rod 18 and be urged by the hair-spring 17 downwardly into the notch 21. At the same time, the cam surface 16 of the latch member 15 will strike against the rear face of the abutment arm 22, so that final forward movement of the rod 10 and the housing 1 will cause the latch member 15 to be swung past the end 26 of the traction bar 24 into its original upright latched position, as shown in Figure 2. The operator may thereupon reaccelerate the engine by again depressing the foot pedal 13.

Since it is desirable that the set hand 36 be locked at any desired position of maximum speed adjustment, I may provide a locking mechanism comprising a pair of concentric shells 44, 45, in turn, concentrically disposed within the knob C. The shell 45 is integrally formed with, and rigidly held against rotation by, the outer extremity of the sleeve 34, the latter being bored for receiving an inner shaft 46, which, at its outer extremity, is preferably integrally attached to the inner concentric shell 44 and is, at its other end, rigidly attached to the set hand 36. The inner concentric shell 44 is further provided with a cylindrical tumbler barrel 47 axially slotted for the reception of a suitable key 48. The outer concentric shell 45 is provided with a radially outwardly extending annular rim 49 for rotatively supporting the knob C, which is held thereon by the pin c and having an inwardly presented annular channel 50 provided with a plurality of serrations 51, as best seen in Figures 9 and 11 and for purposes presently more fully appearing.

The inner concentric shell 44 extends outwardly beyond the forward end of the outer shell 45 and the knob C is accordingly provided with an inwardly extending annular flange portion 52 for tight fitting rotative engagement therewith. The concentric shells 44, 45, and the barrel 47 are radially bored and provided with a spring pressed split tumbler 53 having at its upper end a tooth 54 for engagement with the serrations 51 of the shell 45, and being so designed as to connect the two concentric shells 44, 45, with each other when the key 48 is inserted into the lock, at the same time permitting rotation of the barrel 47 within the shell 44.

The knob flange 52, the shell 44, and the barrel 47 are radially bored and provided with a spring pressed split tumbler 55 having two splits and being so designed as to permit the barrel 47, the shell 44, and the knob C to rotate freely within each other when the key is inserted into the lock, as shown in Figure 9.

The barrel 47 is further provided along its peripheral surface with a circumferential slot 56 extending approximately in an arc of 90° for receiving the limit-pin 57 mounted in and extending radially inwardly from the shell 44, as best seen in Figure 10 and for purposes presently more fully appearing. The shell 44 is further provided with an inwardly opening radial recess 58 in the same transverse plane as the split tumbler element 55, and being provided with a spring pressed tumbler section 59 adapted for cooperation with the tumbler section 55' of the tumbler 55 for locking the shell 44 to the barrel 47 when the latter is rotated to locked position and the key removed, also as best seen in Figure 10.

In locked position with the key 48 removed, the barrel 47 will be turned within the shell 44 to the position shown in Figure 10, at which position the tumbler section 55' will be pushed inwardly due to the removal of the key and the tumbler section 59 will be thus urged inwardly, thereby locking the barrel 47 and the shell 44 rigidly together. By reference to Figures 9 and 11, it will be evident that when the barrel 47 is in this locked position, the tumbler section 53' will be rotated away from the upper associated section 53" of the tumbler, the latter being held against the cylindrical face of the barrel 44 in upwardly disposed position and in retentive engagement with the serrated section 51 of the non-rotative shell 45. The knob C, on the other hand, is completely disconnected and may be rotated freely.

When the key 48 is inserted, the tumbler section 55' will be displaced upwardly in the usual manner, releasing the shell 44 from the barrel 47, whereupon the latter may be rotated through an arc of approximately 90° into the position shown in Figures 9 and 11.

When the key 48 is removed, both tumblers 53 and 55 will shift downwardly under the action of their respective springs, whereupon the knob C, the shell 44, and the barrel 47 will all be locked one to the other by the tumbler element 55. Similarly, the shell 44 will be released from engagement with the serrations 51 of the shell 45.

In this unlocked condition, the set hand 36 may be turned to any desired position by rotation of the knob C. During this rotation, the shell 44 will be turned to a different position with respect to the rigid shell 45. When the key 48 is again inserted for the purpose of locking the mechanism, the tumbler element 53 will be moved upwardly, so that the tooth 54 thereof will be in retentive engagement with the serrations 51 of the rigid shell 45 at the newly set position. The insertion of the key 48 furthermore will return the tumbler element 55 to original position, thereby releasing the knob C, the shell 44, and the barrel 47 each from the other, whereupon the key 48 and the barrel 47 may be turned to the initial or locked position shown in Figure 10, at which position the key may be removed, thereby locking the set hand at its newly adjusted position.

It should be understood that changes and modifications in the form, construction, arrangement, and combination of the several parts of the speed regulating device may be made and substituted for those herein shown and described without departing from the nature and principle of my invention.

Having thus described my invention, what I claim and desire to secure by Letters Patent is:

1. An accelerator control comprising a first member operably mounted for longitudinally shiftable movement responsive to movement of the accelerator pedal, a second member operably mounted on the first member for shiftable movement relative thereof, a latch swingably mounted on the first member and being engageable with the second member for holding said first and second members rigidly with respect to each other, and electro-magnetic latch disengaging means operably mounted on the first member for bodily movement therewith and being actuable responsive to a predetermined speed limit of the vehicle for disconnecting said first and second members.

2. A speed regulating throttle controller comprising a first bar member, a second bar member shiftably mounted on the first bar member and having a detent therein, a latch member rockably mounted on the first bar member and engageable with said detent for locking said bars together, and means mounted on the first bar for releasing the latch member responsive to an external impulse.

3. A speed regulator for a throttle controlled vehicle comprising a pair of relatively shiftable rods, one of said rods being provided with a detent and the other of said rods being provided at its end with a rockable latch engageable in the detent, a swingable bar for normally holding the latch in detent-engaging position, and means carried by the latch-equipped rod for withdrawing the bar from latch-engaged position.

4. A speed regulator for a throttle controlled vehicle comprising a pair of relatively shiftable rods, one of said rods being provided with a detent and the other of said rods being provided at its end with a rockable latch engageable in the detent, an armature for normally holding the latch in detent-engaging position, and electro-magnetic means carried by the latch-equipped rod for withdrawing the armature from latch-engaged position.

5. A speed regulator for a throttle controlled vehicle comprising a pair of relatively shiftable rods, one of said rods being provided with a detent and the other of said rods being provided at its end with a rockable latch engageable in the detent, a swingable bar for normally holding the latch in detent-engaging position, means carried by the latch-equipped rod for withdrawing the bar from latch-engaged position, and an upstanding lug formed on the detent-equipped rod adjacent the detent thereof for resetting the latch when the rods return to normal position after having been unlatched.

SIDNEY E. EPPERSON.